United States Patent [19]

Taoda et al.

[11] Patent Number: 4,885,699

[45] Date of Patent: Dec. 5, 1989

[54] DATA PROCESSING APPARATUS FOR EDITING, FILING, AND PRINTING IMAGE DATA BY MEANS OF VISUAL OBSERVATION OF THE DATA ON A DISPLAY SCREEN

[75] Inventors: Masami Taoda; Hironobu Machida, both of Yokohama, Japan

[73] Assignee: Kabushiki Kaisha Toshiba, Kawasaki, Japan

[21] Appl. No.: 101,981

[22] Filed: Sep. 28, 1987

[30] Foreign Application Priority Data

Dec. 26, 1986 [JP] Japan ................................ 61-315386

[51] Int. Cl.⁴ ................................ G06F 11/10

[52] U.S. Cl. ................................ 364/518; 364/134; 364/200

[58] Field of Search ............... 364/200, 518, 521, 134; 340/750

[56] References Cited

U.S. PATENT DOCUMENTS

| | | | |
|---|---|---|---|
| 4,547,812 | 10/1985 | Waller et al. | 358/283 |
| 4,601,003 | 6/1986 | Yoneyama et al. | 364/518 |
| 4,648,045 | 3/1987 | Demetrescu | 364/518 |
| 4,660,168 | 4/1987 | Grant et al. | 364/900 |
| 4,672,537 | 6/1987 | Katzman et al. | 364/200 |

*Primary Examiner*—A. D. Pellinen
*Assistant Examiner*—David Osborn
*Attorney, Agent, or Firm*—Finnegan, Henderson, Farabow, Garrett and Dunner

[57] ABSTRACT

An image processing apparatus comprises a memory for storing image data and character data, a display for displaying data stored in said memory means, and a three-address generating section for generating three addresses for addressing the memory to execute simultaneously two processings, one of which transfers the data from the memory to the display and the other of which writes character information into said memory.

13 Claims, 9 Drawing Sheets

DATA PROCESSING APPARATUS FOR EDITING, FILING, AND PRINTING IMAGE DATA BY MEANS OF VISUAL OBSERVATION OF THE DATA ON A DISPLAY SCREEN

BACKGROUND OF THE INVENTION

This invention relates to an image processing apparatus for editing, filing, and printing out image data such as document information stored in a bit map memory, by means of visual observation of the document image on a display screen.

Nowadays, there are many types of data processors which can perform image data processing. These include personal computers, work stations, electronic filing systems, and image editing systems. The main demands of the major users in this field are for an increase in the data processing speed, and for the attainment of a parallel processing capability.

An image data processing apparatus needs to perform a number of functions. For example, one function needed is to input character data to the image processor or the message is displayed on the screen while the image data is stored in the bit map memory, by using an image input/output device such as a scanner or a printer, or while the image data in the bit map memory is output to the printer. To realize these functions, at least one address generator is needed for transferring the image data between the image input/output device and the bit map memory. To store character fonts in the bit map memory and display them on the display, requires that at least two address generators be provided; one for generating the address, in order to write the character fonts into the bit map memory, and the other to read out the character fonts from the character fontment.

The conventional document processor is provided with one or two address generators for accessing the bit map memory. Therefore, it is impossible to perform concurrently the displaying of the character font and the transferring of the image data in the conventional document processor. Further, when the printer is printing a number of documents, the operator cannot execute another processing. In this respect, the operability of the conventional image processing apparatus is poor.

SUMMARY OF THE INVENTION

Accordingly, an object of this invention is to provide an image processing apparatus with improved operability.

An image processing apparatus according to this invention comprises memory means for storing image data, display means for displaying the image data stored in the memory means, and address generating means for generating three or more addresses when the image data in the memory means is accessed.

DETAILED EXPLANATION OF THE PREFERRED EMBODIMENT

Figure 1:
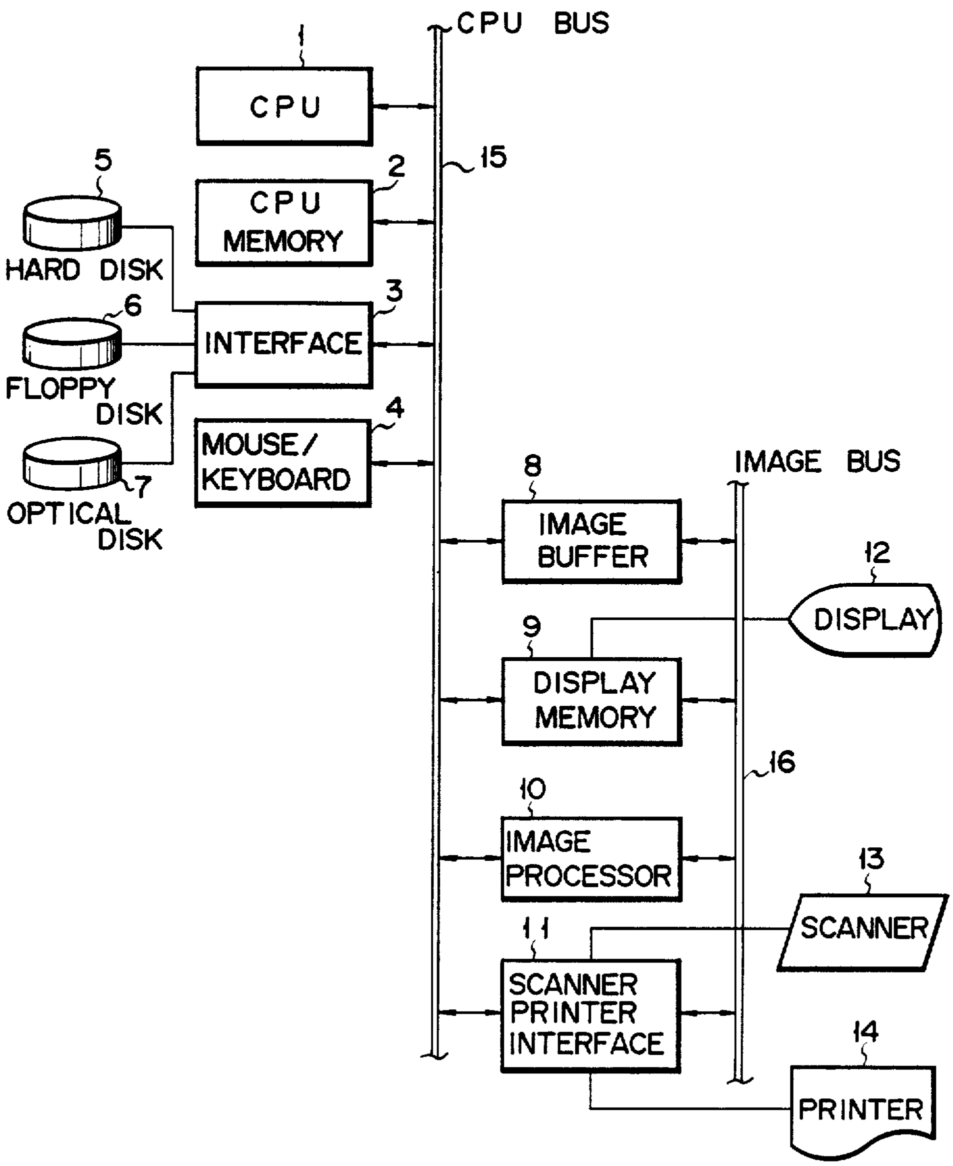
FIG. 1 is a block diagram schematically illustrating an overall arrangement of an overall image processing apparatus.

FIG. 1 shows an electronic filing apparatus as an image processing apparatus according to this invention. In this apparatus, CPU 1 executes various types of controls. CPU memory 2 stores control programs, for example. Interface 3 is coupled with hard disk 5 for storing data base, and the like, such as a magnetic disk, floppy disk 6 as a memory device, and an optical disk 7 for storing document image. Interface 3 and mouse/keyboard 4 is coupled through CPU bus 15 to CPU 1 and CPU memory 2. CPU bus 15 is coupled with image buffer 8, display memory section 9, image processor 10, and scanner/printer interface 11. Mouse/keyboard 4 is used for entering retrieval codes respectively assigned to image data and various types of operation commands. Image buffer 8 for storing the image data has a memory capacity large enough to store the image data of a plurality of documents. Display memory section 9 is for storing the information to be displayed by display 12, and pattern data of characters and symbols. Image processor 10 executes various types of image processings such as rotation, expansion, and reduction. Scanner/printer interface 11 interfaces the main unit of the filing apparatus with scanner 13 as a two-dimensional scanner for entering image data, and printer 14 for providing a hard copy of the image data. CPU memory 2, interface 3, mouse/keyboard 4, image buffer 8, display memory section 9, image processor 10, and scanner/printer interface 11 are controlled by CPU 1, with its access through CPU bus 15.

Image bus 16 for transferring image data at a high speed is coupled with image buffer 8, display memory section 9, image processor 10, image bus 16 and scanner/printer interface 11.

The image buffer memory 8 constructed as a memory board and display memory section 9 are each provided with a plurality of address generators to access the memory, and these memories are coupled to allow the image data to be transferred therebetween.

To enter the image data from scanner 13, CPU 1 sets the necessary parameters in each device, and drives scanner 13. The image data is transferred through scanner/printer interface 11 to image buffer 8. The image buffer 8 transfers a clock signal to the address generators in synchronism with the entering of the image data, and successively updates the addresses, and stores the image data into display memory section 9.

To output the image data of display memory section 9 to printer 14, one of the address generators in display memory section 9 generates an address of the image data to be printed out. With the address, the memory location storing the image data in the display memory is read out, and transferred through image bus 16 and scanner/printer interface 11 to printer 14, to effect the printing of the image data.

Figure 2:
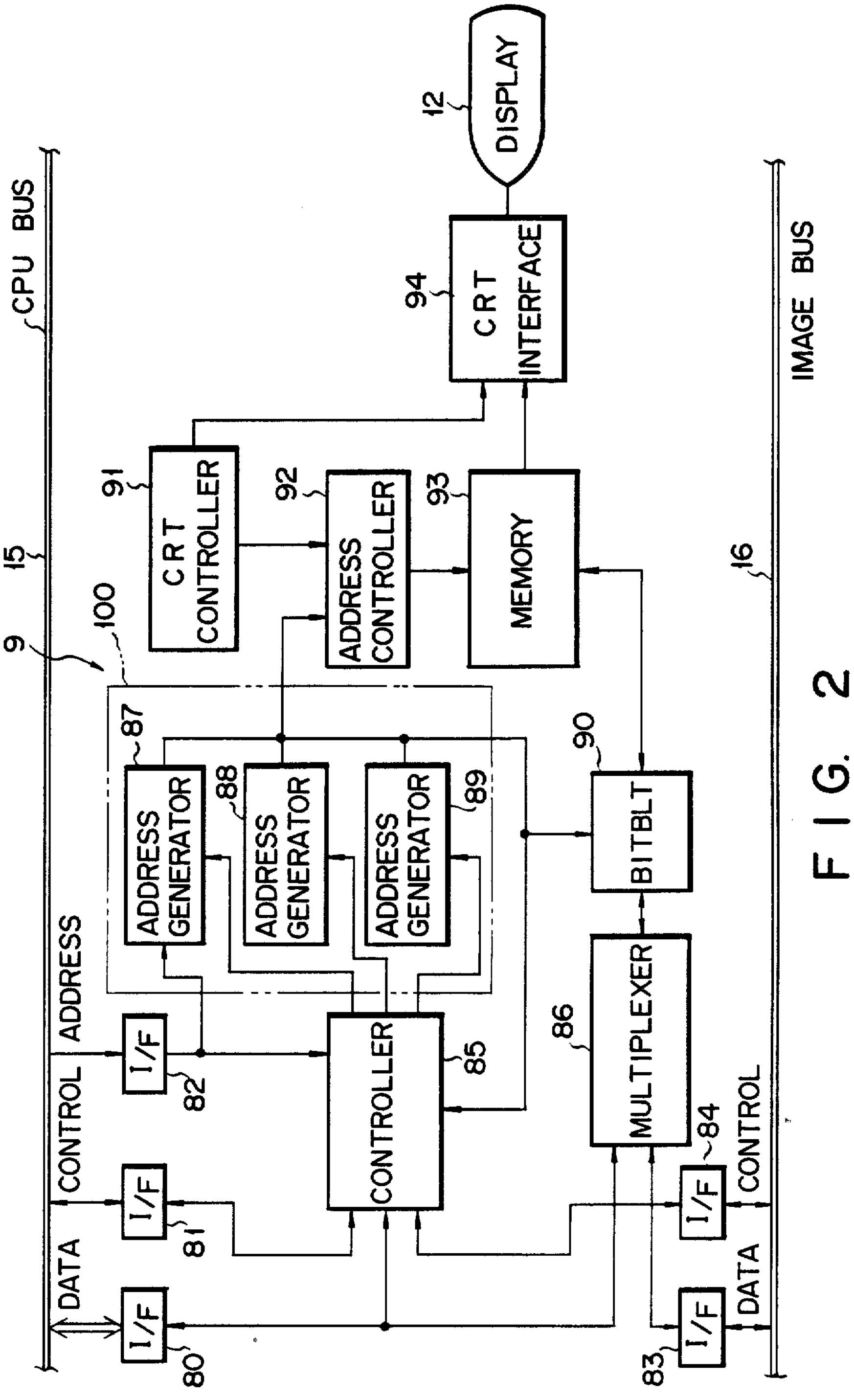
FIG. 2 is a block diagram illustrating an arrangement of a display memory unit.

Display memory section 9, as shown in FIG. 2, contains controller 85, which controls all of CPU bus interfaces 80 to 82, image bus interfaces 83 and 84, and display memory section 9. Display memory section 9 further contains multiplexer 86 and first to third address generators (first to third address generating sections) 87 to 89. Multiplexer 86 selects either of the data to be transferred through CPU bus 15 or the data transferred through image bus 16. First to third address generators 87 to 89 generate address signals to make an access to memory 93. CRT controller 91 generates a sync signal for display 12, and address signals for the data to be displayed by display 12. Address controller 92 selects the addresses generated by address generators 87 to 89, and CRT controller 91, and transfers the selected address to memory 93. BITBLT circuit 90 executes the raster operation such as the data processing to write and read out the data to and from memory 93. CRT interface 94 executes the interface between memory 93 and display 12.

First to third address generators 87 to 89 form address generating means 100 to generate three separate addresses.

Figure 3A:
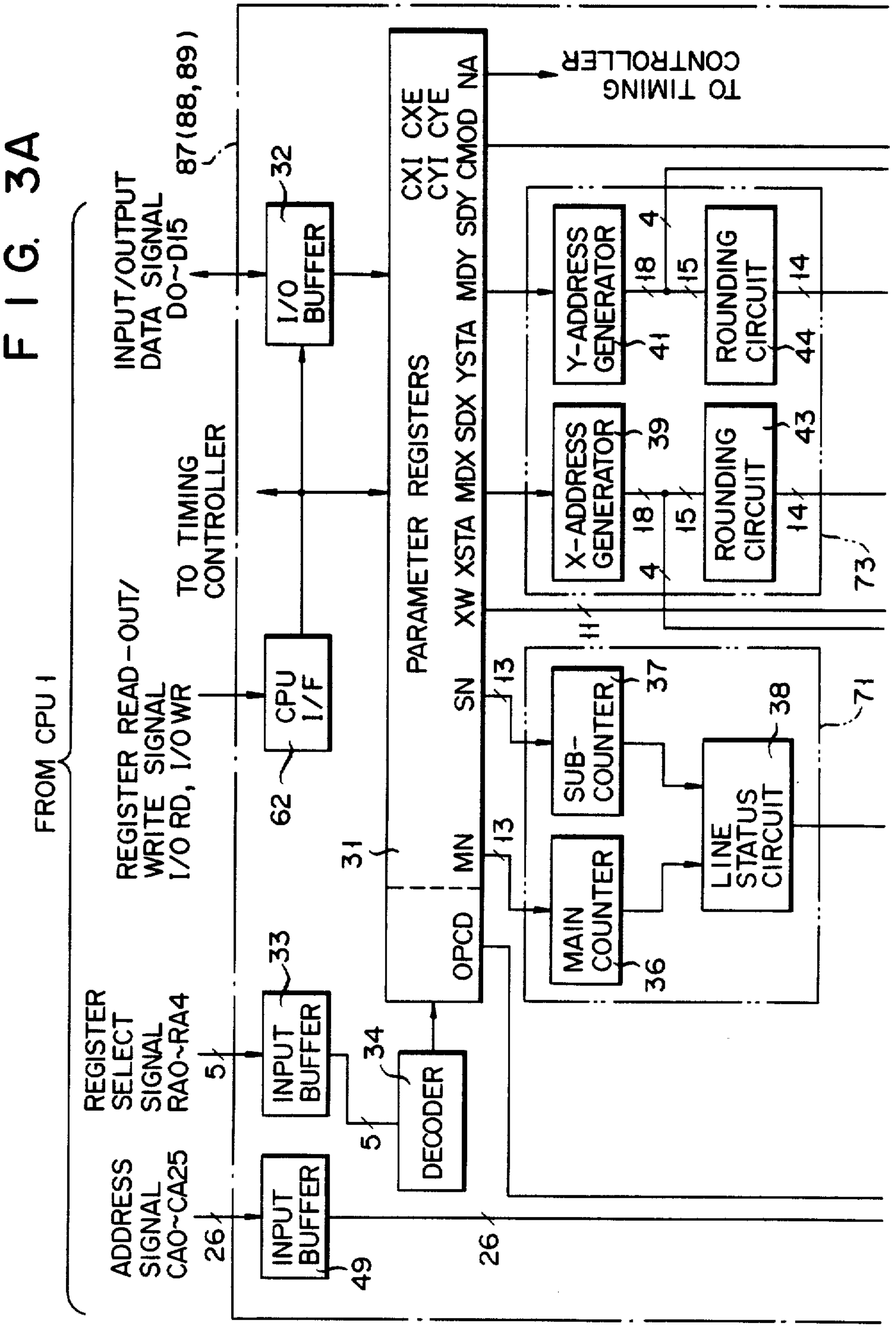
FIGS. 3A and 3B are block diagrams illustrating an arrangement of an address generator.
Figure 3B:
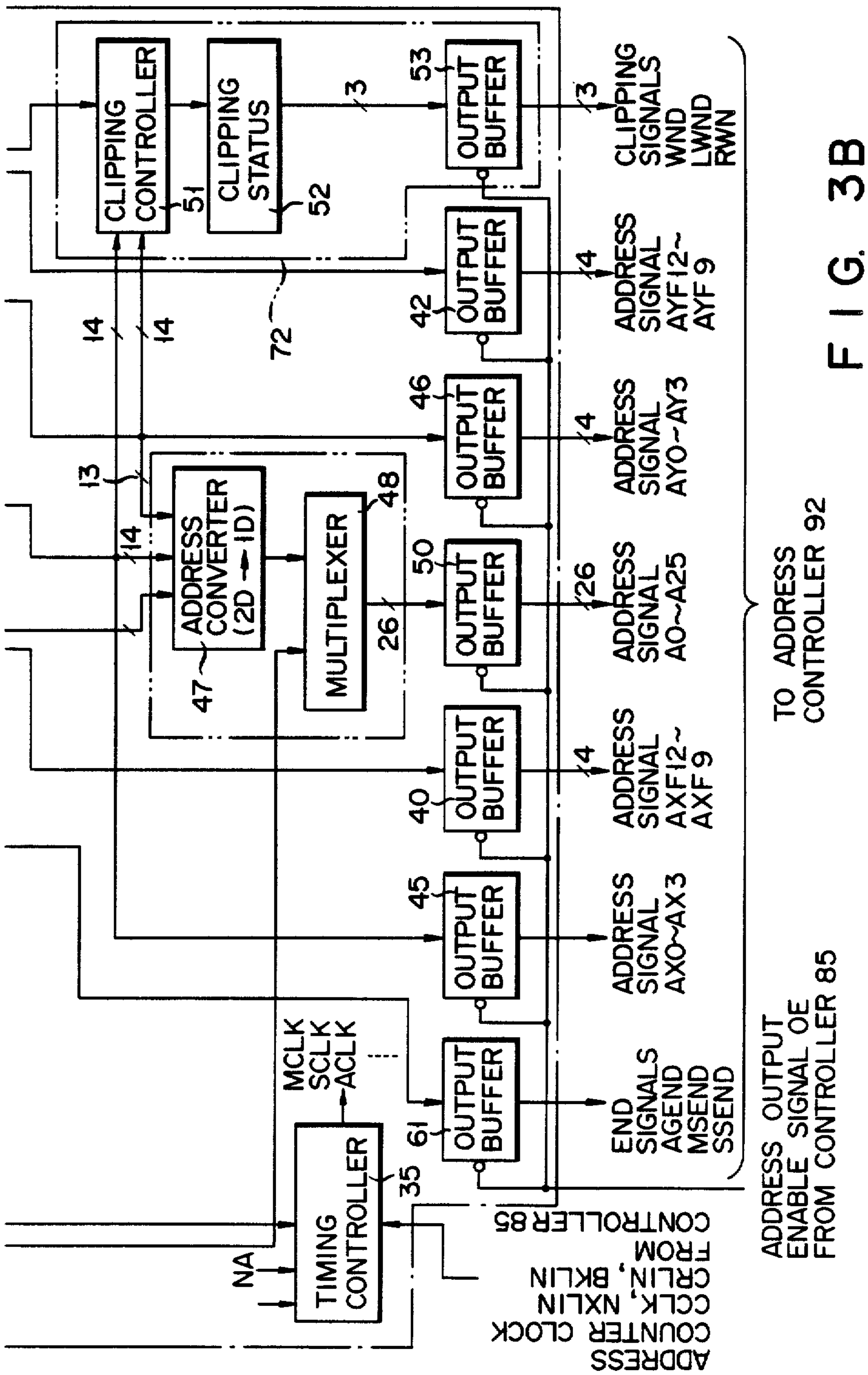

First to third address generators 87 to 89 are each configured as shown in FIGS. 3A and 3B. Parameter register group 31 is made up of a group of registers for storing various kinds of parameters for the address computation. The data (D0 to D15) to be set in the registers are loaded into those registers via I/O buffer 32, from CPU 1. The data are set in the registers as specified by register select signals (RA0 to RA4). Address generator 73 for generating a two-dimensional address signal is made up of X address generator 39, Y-address generator 41, and rounding circuits 43 and 44 for making the approximate calculation to obtain the shortest distance between the addresses. The address output from address generator 73 is converted into the one-dimensional address by address converter 47. The one-dimensional address is multiplexed with the address (CA0 to CA25) from CPU 1, by means of selector 48, and supplied to address controller 92 via output buffer 50.

Line controller 71 controls the main-scan and sub-scan when the address is generated for the affine transformation, and outputs end signals AGEND, MSEND and SSEND.

Clipping control circuit 72 performs the clipping bit by bit. Upon setting of the clipping address, clipping controller 72 compares the clipping address with the address generated by address generator 73, and produces a WND signal indicating the in-window, and an LWND signal representing the left edge of the window, and an RWND signal indicating the right edge of the window. Upon receipt of this signal, BITBLT circuit 90 performs the clipping processing.

Figure 4:
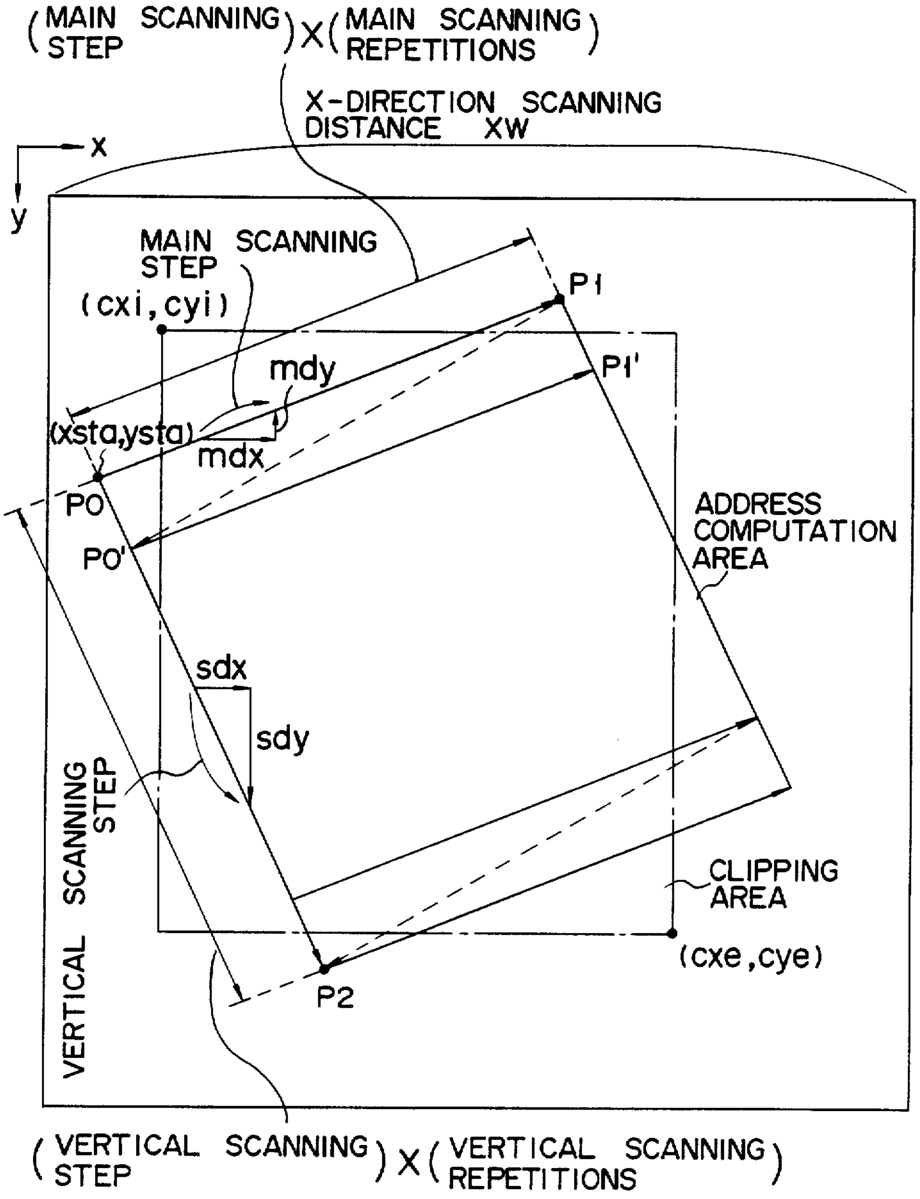
FIG. 4 is a diagram for explaining the what parameters of address generators.

The parameters for address calculation, which are loaded in the parameter register group 31 in each address generator 87 to 89, will be best understood from FIG. 4. In the figure, X-direction scanning width is represented by xw; start address STA by xsta and ysta, number of main scanning steps MD by mdx and mdy, number of sub-scanning steps SD by sdx and sdy, number of repetitions of main scanning MN by mn, number of sub-scanning repetitions SN by sn, clipping address CI and CE by cxi and cyi, and cxe and cye respectively. The main scanning is performed in the direction P0 to P1, and the sub-scanning by P0 to P2. P0 has the coordinates (xsta, ysta), P1 (xsta+(mdx)×(mn), ysta+(mdy)×(mn)), and P2 has the coordinates (xsta+(sdx)×(sn), ysta+(sdy)×(sn)).

Timing controller 35 is for controlling the timings of the overall circuit, and outputs the next address at the rise of the clock CCLK for address counter.

All of output terminals are of the three state type, which is dependent on output enable signal OE.

The detailed operation of one of address generators 87 to 89 are discussed in U.S. Ser. No. 48,665 (filed May 11th, 1987), and hence no further description of them will be described in this specification.

Figure 5:
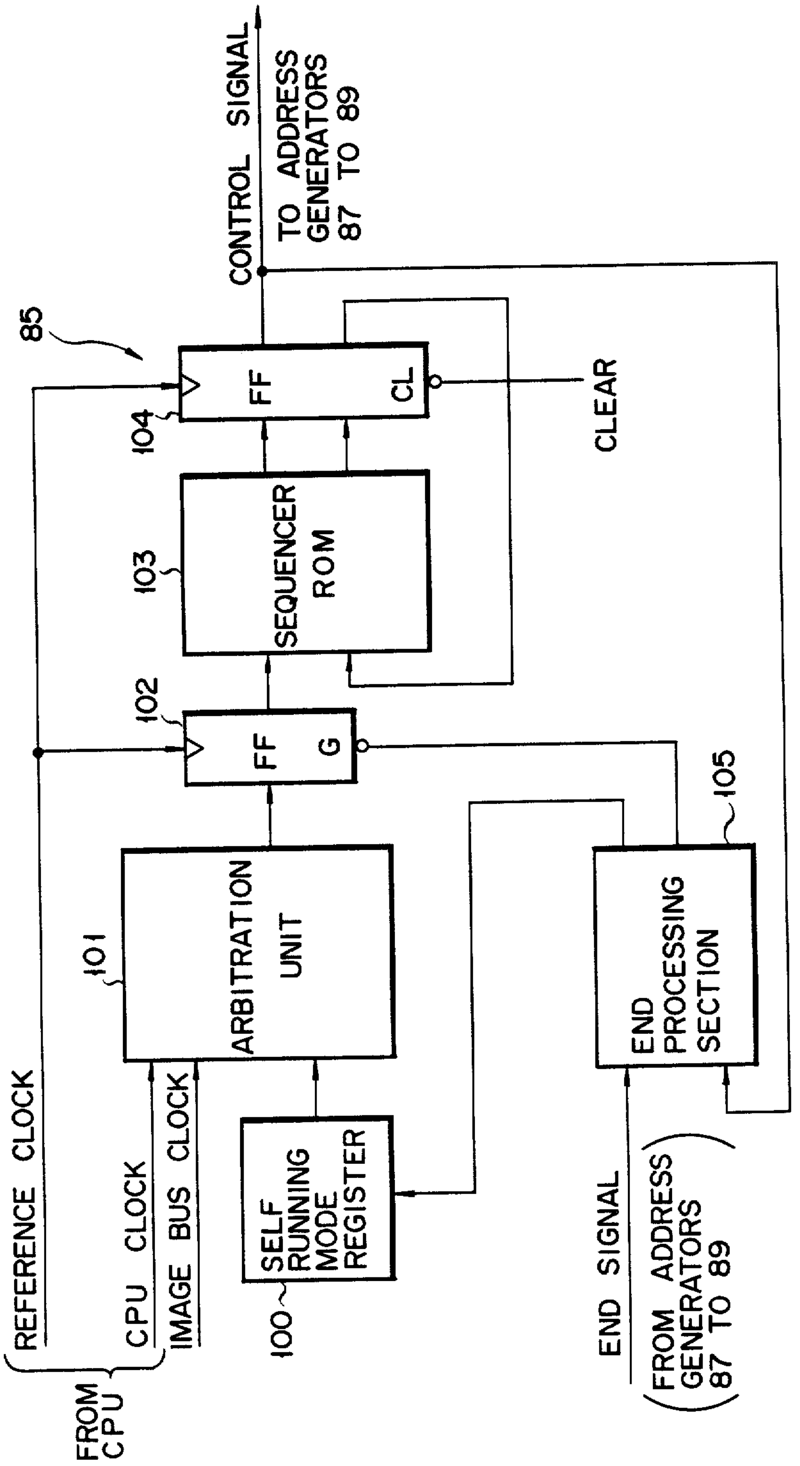
FIG. 5 is a block diagram of a controller used in the display memory section.

The controller 85 of display memory 9 will be described while referring to FIG. 5.

Controller 85 is of the free-running type, which is operable only within display memory section 9, and free from external influence. Controller 85 contains free-running mode register 100 for outputting an enable signal and arbitration section 101. Arbitration section 101 receives a free-running enable signal from free-running mode register 100, a free-running mode signal and a CPU clock signal as an access clock signal from CPU 1, and an image bus clock signal as an access clock signal from image bus 16. When receiving these signals, arbitration section 101 selects the processing to be executed, and outputs a code corresponding to the selected processing. Flip-flop (FF) 102 latches the code from arbitration section 101. Sequencer ROM 103, which is a ROM storing control signal for circuits in their various operations, outputs a control signal corresponding to the code latched by FF 102. FF 104 latches a control signal from sequencer ROM 103. End processor 105 receives end signals AGEND from address generators 87 to 89, detects the end of free-running mode, and disables the enable signal of free-running register 100, to prohibit the access to the controller after the free-running operation.

The free-running mode contains a DRAW mode to draw patterns using one address generator, a copy mode for copying the data in memory 93 using two address generators, a swap mode for swapping the data between two memory areas, and a character mode for writing character fonts.

The signal latched in FF 104 is not only the control signal, but also is the lower address of sequencer ROM 103 that is fed back to sequencer ROM 103. Therefore, if the lead address is stored in the lower address of sequencer ROM 103, any address in sequencer ROM 103 can be accessed, and in this way a control signal can be produced.

The control signal output from sequencer ROM 103 contains an access end signal. End processor 105 forms an enable signal in FF 102. After the sequence terminates, the next access mode is received by arbitration section 101.

Figure 6:
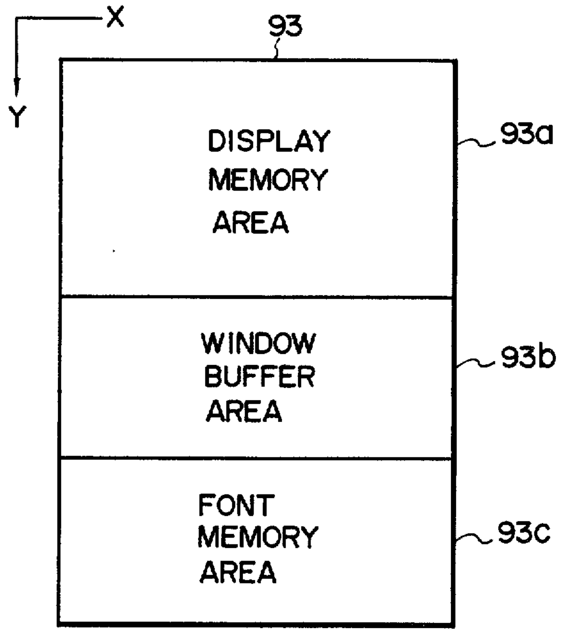
FIG. 6 is a memory map of a display memory section.

Memory 93 of display memory section 9 will be described while referring to FIG. 6.

Memory 93 is a bit map memory. As a two dimensional memory, its memory area is divided into three memory areas, display memory area 93*a*, window buffer area 93*b*, and font memory area 93*c*.

Display memory area 93*a* is for actual display of image data in display 12. Only the image data stored in this area is displayed by display 12. Window buffer area 93*b* stores the property sheet to be displayed in display 12, and temporarily stores the data stored in display memory area 93*a*. In this case, the property sheet is displayed by swapping the data in display memory area 93*a* and window buffer area 93*b* by using the copy mode or the swap mode in the free-running mode.

Font memory area 93*c* stores the character fonts. For displaying characters on display 12, the character fonts in font memory area 93*c* are written into display memory area 93*a* using the free-running mode. The operation of the memory thus arranged will be described.

Figure 7:
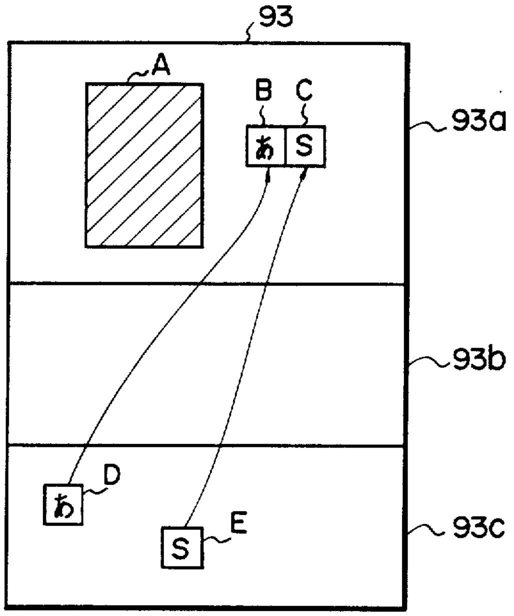
FIG. 7 is a diagram for explaining image transfer in the memory.

The following operation is to output the image data in memory area A in FIG. 7, which is stored in display memory section 9 and displayed on display 12, to printer 14.

To access the memory area A, first address generator 87 is used. CPU 1 sets the parameter to access this A area to parameter register group 31 in first address generator 87. Similar and necessary parameters are set in image processor 10 and scanner/printer interface 11.

In response to the command from CPU 11, the operation is started, and the image bus clock signal for data read out is transferred from image processor 10 through image buffer 16 to display memory section 9. In this section, the image bus clock signal is input to controller 85. As a result, in the arbitration 101 in controller section 85, the processing mode is selected. At this time, the clock signal from CPU 1 and the enable signal in the free-running mode are disabled. Therefore, in arbitration section 101, the image bus read mode is selected, and the code as the upper address to sequencer ROM 103 is latched in FF 102.

Sequencer circuit operates and the image bus read control signal is output from FF 104. By this control signal, first address generator 87 is selected, the output enable signal is enabled, and first address generator 87 produces an address of memory area A. This address is supplied through address controller 92 to memory 93, and the RAS and CAS signals are applied as control signals to memory 93. Responsive to the control signals, the data is read out of the memory area A, and output to image bus 16, via BITBLT circuit 90, multiplexer 86, and image bus interface 83. The image data output onto image bus 16 is sent to printer 14 via scanner/printer interface 11 and printed out as a hard copy.

Repeating the above operation, the image data of the memory area A is output to printer 14. The image data in display memory section 9 is printed out in this way.

The operation to display characters in display 12 will now be described.

In memory 93 of FIG. 7, the font data D, stored in font memory area 93*c*, is stored into the area B in display area 93*a*, and is displayed by display 12. In this operation, second and third address generators 88 and 89 are used. The second address generator 88 generates an address for the font data in font memory area 93*c*. The third address generator 89 generates an address for area B in display memory area 93*a*. To this end, CPU 1 sets an address in the parameter register 31 of each address generator.

Then, the character mode and free-running enable signals are set in free-running mode register 100, and the character display sequence starts. At this time, in arbitration section 101, the code for character mode is output, and latched in FF 102. Sequencer ROM 103 produces a control signal, which in turn is latched in FF 104, and the control signals are sent to each circuit of display memory section 9. In this control, an output enable signal is sent to second address generator 88, this generator 88 outputs a start address of font data D, and is input to memory 93 via address controller 92.

At this time, FF 104 transfers RAS and CAS signals as control signals to memory 93, to read out font data D from the memory. This data is temporarily stored in the internal register of BITBLT 90. The output enable terminal of second address generator 88 is enabled, and placed in a high impedance state. Simultaneously, the clock signal CCLK for address counter is input to second address generator 88, to update the address to the next address.

Subsequently, the output enable terminal of third address generator 89 is enabled, and a start address of the area B in display memory area 93*a* is output, and applied to memory 93 via address controller 92. In synchronism with this, RAS, CAS and WE signals as control signals are applied to memory 93, so that the font D data latched in the internal register in BITBLT circuit 90 is written into the area B of display memory area 93*a* in memory 93.

At the end of this write operation, the output enable terminal of third address generator 89 is disabled. The clock signal CCLK for address counter is input to third address generator 89, so that the address of the destination side, i.e., the area B of display memory area 93*a*, is updated to be the next address.

Repeating cyclically the above operation, the data of font data D is stored in area B of display memory area 93*a*, and displayed on display 12. At this time, if the final data is written into area B, second and third address generators 88 and 89 outputs end signals AGEND, and input to end processor 105. As a result, the free-running enable terminal of free-running mode register 100 is disabled, and the character mode terminates.

The above operations output the image data stored in display memory section 9 to printer 14, and display the characters in display 12. The operation explained below will simultaneously execute the above two operations.

The operation begin with the transfer of the image data from display memory section 9 to printer 14. This operation is performed by first address generator 87, as described above. This printer output phase (1) in FIG. 8, enables the image bus clock, enables the output enable terminal AGC10E of first address generator 87, addresses AD11 to memory 93, reads out data D11 and transfers it to printer 14. When the character display operation by display 12 occurs concurrently, the necessary parameters are set in second and third address generators 88 and 89, and then character mode and free-running enable signals are set in free-running mode register 100.

Figure 8:
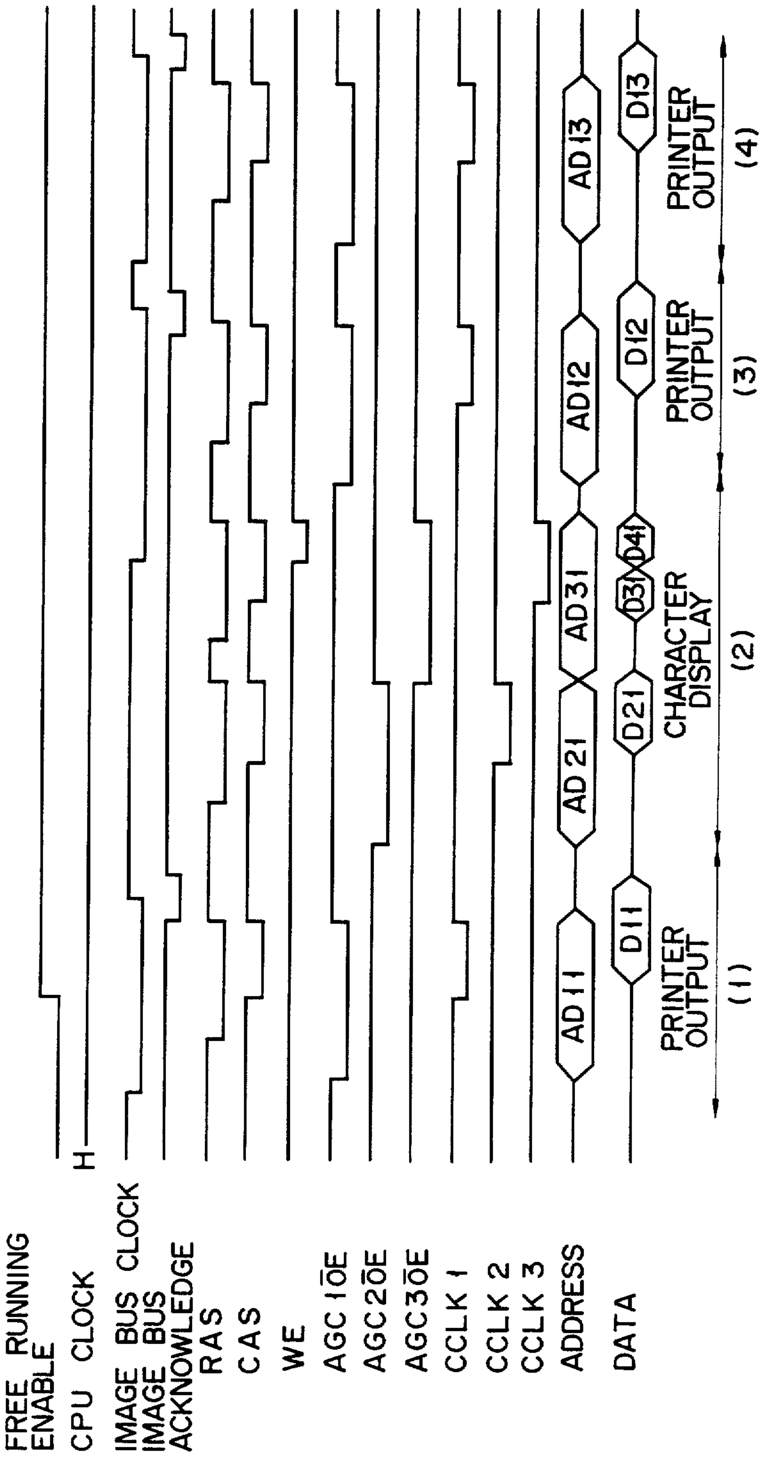
FIG. 8 is a timing chart of various signals when characters are displayed during the course of transferring the image data from the display memory to the printer.

Following the printer output phase, a character display phase (2) of FIG. 8 starts, upon select of the free-running mode code by arbitration section 101. As described above, the output enable terminal ADC20E of second address generator 88 is enabled to read out the data D21 of source side, i.e., the character fonts. Then, the output enable terminal AGC30E of third address generator 89 is enabled to read out data D31. This data is processed by BITBLT circuit 90, and written as data D41 into display memory area 93*a* of memory 93.

During this, the next image bus clock signal is input to arbitration section 101, and the operation enters a printer output (3) of FIG. 8.

As described above, three address generators are used. In arbitration section 101, two operations, i.e., the output to printer 14 and the character display in display 12, are switched, so that the printer output and character display are simultaneously performed.

Thus, with provision of three address generators, one address generator is assigned to the image data transfer, and the remaining two address generators are assigned to the address generation in source and destination sides for character display. The addresses of these three address generators are used for memory access. Therefore, characters can be displayed while the image data is transferred between the bit buffer memory and the image input/output devices. Thus, characters can be transferred and displayed during the image transfer to the printer, during the image read-in by the scanner, and during the transfer of the image data from the optical disk to the display memory. With this feature, the operator can smoothly operate the image processing apparatus without an interrupt of the key board operation.

The operation of display memory section is correspondingly applicable for the operation of the image buffer.

Figure 9:
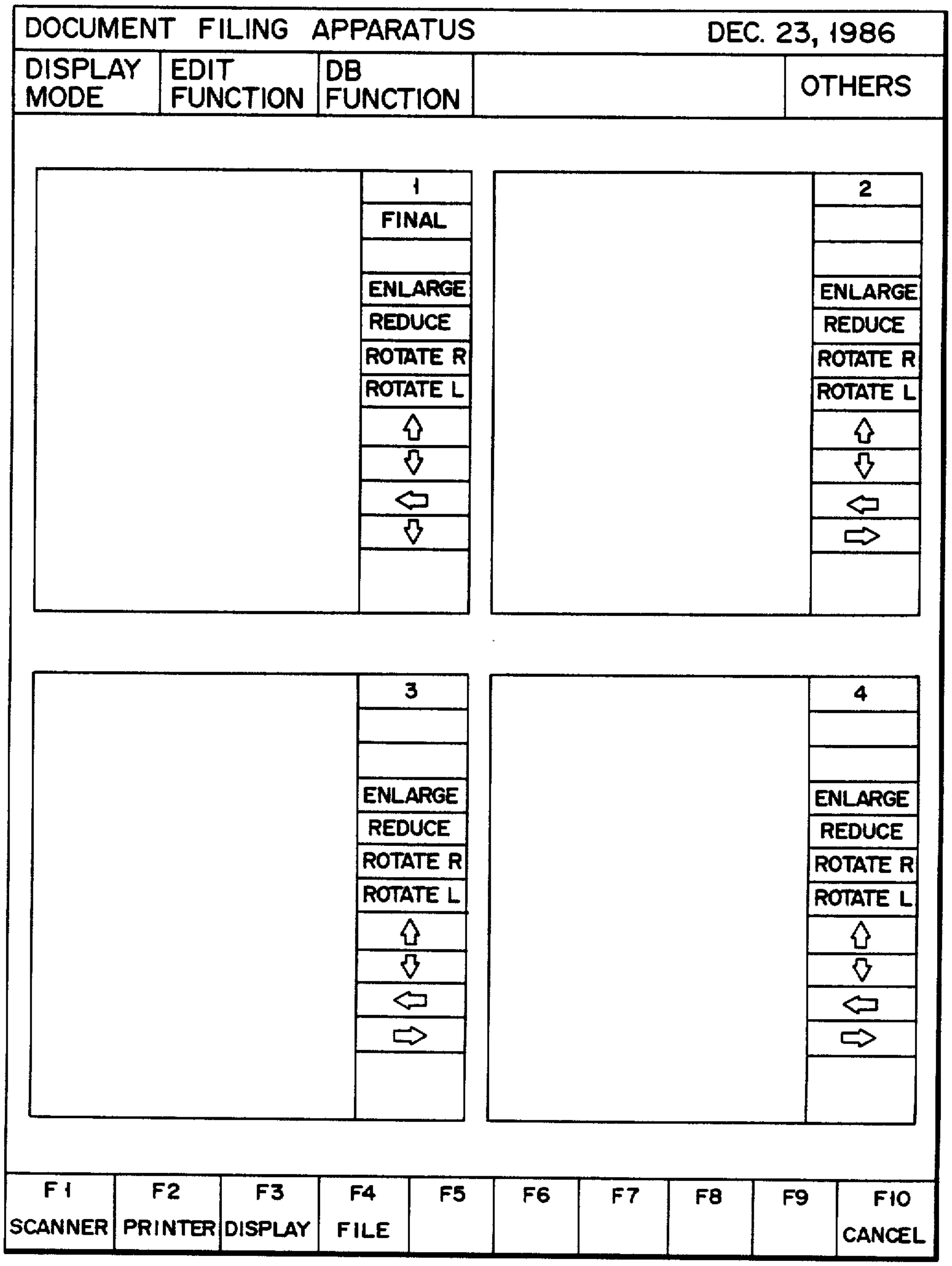
FIG. 9 is a plane view of a display screen.

The operation can carry out, in parallel a plurality of processings, using multi-windows. In multi-windows as shown in FIG. 9, one window W1 is used for displaying the document image, while document images are continuously output from scanner 13 and printed out by printer 14 or recorded on optical disk 7. In the prior art, the character information can be supplied by keyboard 4 (or word processor) and displayed on another window W2 only in an interval corresponding to a time lag from the complete of input of one frame image until the start of input of a next frame image. This is because one address generator is occupied to access display memory 9 in order to continuously display the document images on window W1. The result is a lowered work efficiency. However, in the present invention, three address generators are provided. One address generator is used for accessing display memory 9 when the image information from scanner 13 is transferred to printer 14. The character information, in turn, can be formed on display memory 9 by the remaining two address generators.

When the image displayed on display 12 is repeatedly read out from display memory 9 and output to, for example, printer 14, similarly one address generator is used for accessing the image displayed on display 12, while remaining address generators are used for forming character information in display memory 9.

In the above embodiment, the data transfer from scanner 13 to printer 14 and the formation of character information are carried out in parallel. The data transfer also can be executed in parallel with the operation requiring two address generators, such as the image copying operation or data exchanging operation.

As described above, the characters can be written into the image memory while the image data is read out from the image memory such as the image buffer or the display memory. Furthermore, the characters can be written into image memory while the image data is transferred to the printer and the image data from the scanner is stored into the image memory.

It is evident that this invention embodies use of more than three address generators.

What is claimed is:

1. A data processing apparatus comprising:

memory means for storing data, the memory means having a display memory means for storing at least one of image data and character data to be displayed, and a font memory means for storing the character font data;

display means for displaying the data stored in said memory means; and means for generating at least three addresses for addressing said memory means to execute simultaneously at least two processings of first, second and third processings, the first processing for writing the image data into the memory means, the second processing for reading out the image data and character data from the display memory means, and the third processing for transferring the character font data from the font memory means to the display memory means.

2. The data processing apparatus according to claim 1, wherein said address generating means includes first, second and third address generators for generating first, second and third addresses, one of which accesses said memory means to execute the first processing and the other two of which access said display memory means and said font memory means to execute the second and third processing.

3. The data processing apparatus according to claim 2, wherein said address generators each include a register group for storing various parameters for address calculation, an address generating circuit for generating a two-dimensional address, on the basis of parameters from said register group, and an address generator for converting the two-dimensional address from said address generating circuit into a one-dimensional address.

4. The data processor according to claim 2, wherein said first addresss generator generates an address for accessing said display area, to read out the image data from said memory means, said second address generator generates an address for accessing said font memory area, to read out the data of character fonts therefrom, and said third address generator generates an address for accessing said memory means, to write said data of the character fonts into said display memory area.

5. The data processing apparatus according to claim 4, wherein said display memory area includes a first memory section for storing the image data, and a second memory section, for storing font data, said first address generator generates an address corresponding to said first memory section, to output the image data to said printer means, and said third address generator generates an address corresponding to said second memory section, to display the character data.

6. The data processing apparatus according to claim 2, wherein said display means displays multi-windows, and said first address generator generates the address for addressing said memory means, to transfer therefrom the image data to be displayed, in one of said multi-windows, and said third address generator generates the address for addressing said memory means, to display the character information to be written into said memory, in another of said multi-windows.

7. The data processing apparatus according to claim 6, which includes a scanner for producing the image data and a printer for printing the image data, and wherein one of said three address generators generates the address for addressing said memory means, to write into said memory means the image data output from said scanner, and to read out the image data and transfer it to said printer.

8. A data processing apparatus comprising:

memory means for storing data, the memory means having a display memory means for storing at least one of image data and character data to be displayed;

means for generating at least three addresses for accessing the memory means, to execute simultaneously at least two processings of first, second and third processings, the first processing for storing the image data into the display memory means, the second processing for reading out the data from the display memory means, and the third processing for transferring the character data to the display memory means.

9. The data processing apparatus according to claim 8, wherein the memory means includes a character font memory means for storing character font data, and the address generating means generates the three addresses including first, second and third addresses, the first address accessing the memory means for writing the image data into the memory means, and the second and third addresses accessing the display memory means and the character font memory means for transferring the character font data stored in the character font memory means to the display memory means.

10. The data processing apparatus according to claim 8, wherein the memory means includes a character font memory means for storing character font data, and the address generating means generates the three addresses including first, second and third addresses, the first address accessing the memory means for reading out the stored data from the memory means, and the second and third addresses accessing the display memory means and the character font memory means for transferring the character font data stored in the character font memory means to the display memory means.

11. The data processing apparatus according to claim 8, wherein the address generating means generates the three addresses including first, second and third addresses, the first address accessing the memory means for writing the image data into the memory means, the second address accessing the memory means for transferring the stored data to the display means, and the third address accessing the memory means for transferring the stored data to a printer.

12. The data processing apparatus according to claim 8, wherein the address generating means generates the three addresses including first, second and third addresses, the first address accessing the memory means for writing the image data output from a scanner into the memory means, the second address accessing the memory means for writing the image data output from an optical disk into the memory means, and the third address accesssing the memory means for transferring the stored data to the display means.

13. The data processing apparatus according to claim 8, wherein the address generating means generates the three addresses including first, second and third addresses, the first address accessing the memory means for writing the image data output from a scanner into the memory means, the second address accessing the memory means for writing the image data output from an optical disk into the memory means, and the third address accessing the memory means for transferring the stored data to a printer.

* * * * *